Sept. 13, 1932.   H. T. KRAFT   1,876,693
STEERING WHEEL
Filed Feb. 26, 1929   3 Sheets-Sheet 1

INVENTOR
HERMAN T. KRAFT
BY
Evans + McCoy
ATTORNEYS

INVENTOR
HERMAN T. KRAFT
BY
Evans & McCoy
ATTORNEYS

Patented Sept. 13, 1932

1,876,693

UNITED STATES PATENT OFFICE

HERMAN T. KRAFT, OF AKRON, OHIO, ASSIGNOR TO THE H. A. HUSTED COMPANY, OF DETROIT, MICHIGAN, A CORPORATION OF MICHIGAN

STEERING WHEEL

Application filed February 26, 1929. Serial No. 342,734.

This invention relates to steering wheels, and particularly to wheels of the reinforced composition type.

The principal object of the present invention is to provide a steering wheel which is simple in construction, light in weight and economical to manufacture.

Another object of this invention is to provide a composition steering wheel having a reinforcing spider formed with a central hub portion and spokes formed as a unit from a single sheet of metal and secured to said hub portion.

Another object is to provide a metal reinforcing spider for composition steering wheels wherein the spokes are formed in such a manner as to practically eliminate waste material.

A further object is to provide a reinforcing spider for composition steering wheels having spoke portions blanked from a single piece of sheet metal in combination with a novel and improved hub construction.

These being among the objects of the present invention, the same consists of certain features of construction and combinations of parts to be herein described with reference to the accompanying drawings and then claimed, having the above and other objects in view.

In the drawings which illustrate one embodiment of the present invention:

Heretofore, the usual method of forming integral pressed metal spokes for steering wheels was to stamp the same to final shape from a single sheet of metal. As a result, considerable metal was wasted by this prior practice because of the segments which were removed from between the spokes. These segments could not be used for any practical purpose in forming other parts of the steering wheel spider and consequently were usually baled and sold as scrap material. The cost of the metal for steering wheels having spoke elements formed by this prior method, therefore, was relatively high on account of the scrap material.

The present invention proposes a method of forming pressed metal steering wheel spoke elements wherein scrap material is substantially reduced to a minimum by forming the spokes from a single piece of metal in such a manner that in their blanked position they lie substantially parallel to each other in slightly spaced relationship. The spokes are provided with a single interconnecting flange at one end which is later bent around a separately formed hub portion so that the spokes are moved to their respective radial positions. It is also proposed to form a novel and improved hub construction for steering wheel spiders.

Figure 1:
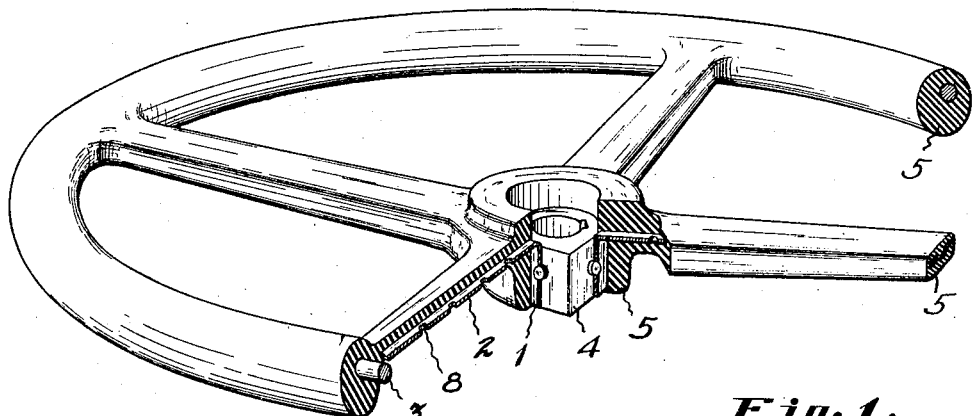
Figure 1 is a fragmentary perspective view of a composition steering wheel having portions of the composition material broken away to show the reinforcing spider.

Referring to the accompanying drawings in which like numerals refer to like parts throughout the several views, the steering wheel as shown in Fig. 1 comprises a reinforcing spider having a central hub portion 1, spokes 2 radiating therefrom which are connected at their outer ends to a continuous rim 3, and a separately formed hub 4 secured to the central hub portion 1 in a manner which will be later described. The reinforcing spider constructed of these parts is preferably covered with a composition material 5 which is molded around the same and joined to all parts thereof in a suitable manner to form a steering wheel which is neat in appearance and of sturdy construction. A wheel formed in this manner will withstand sudden shocks occasioned by accidents and quick stops, and will not break and injure the driver of the vehicle.

Figure 2:
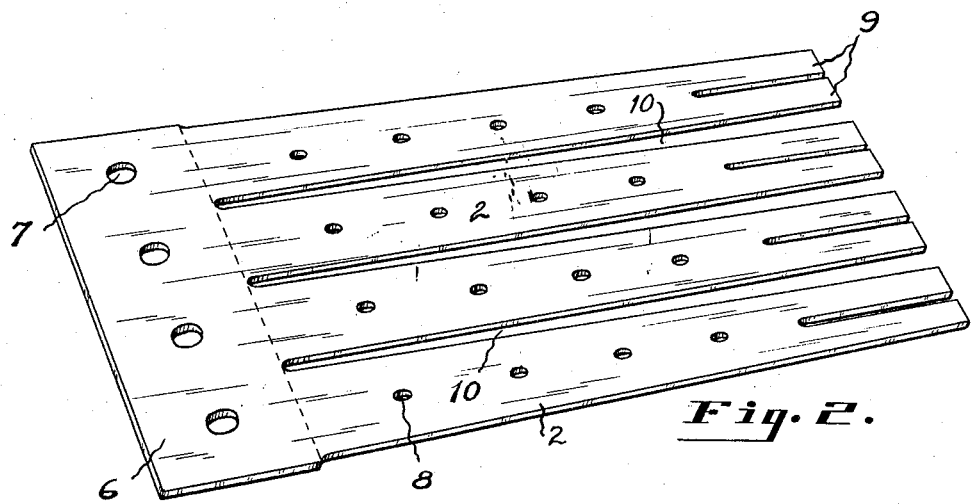
Fig. 2 is an enlarged perspective view of the blank formed by the first operation of this invention.

In forming a wheel of the class just described, a single sheet of metal is first blanked to the shape shown in Fig. 2 in suitable blanking and punching dies in a single operation. This operation provides a blank of rectangular shape having a flat base 6 which later forms the spider hub 1, and spoke portions 2 projecting from the base 6 in substantially parallel closely spaced relationship to each other. As shown in Fig. 2, the base 6 is formed with a plurality of openings 7 substantially on the center lines of the spoke portions 2, and each spoke 2 is also formed with a plurality of perforations 8 substantially on its center line, the function of which will be described later in the specification. Each spoke 2 is also bifurcated at its free end to provide projecting tongues 9. It can be readily seen that the only waste material is that which is produced during punching of the holes and apertures 7 and 8, the slotting of the ends of the spokes 2 to form the tongues 9, and the forming of the narrow spaces 10 between the spokes 2. This waste material is practically negligible as compared with the scrap material produced during the formation of pressed metal spiders used heretofore.

Figure 3:
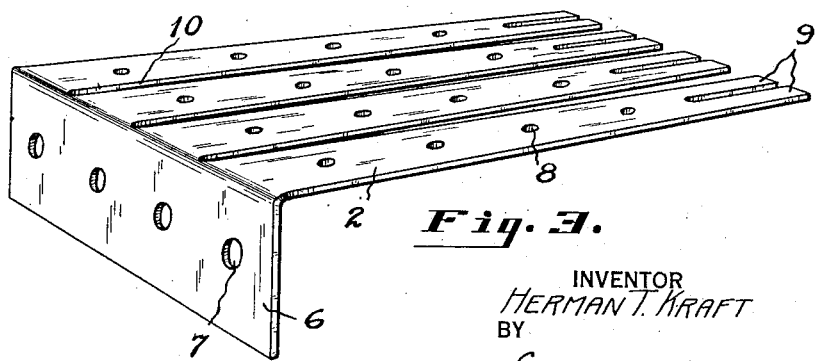
Fig. 3 is a perspective view of the blank shown in Fig. 2 having one end of the same flanged downwardly.
Figure 4:
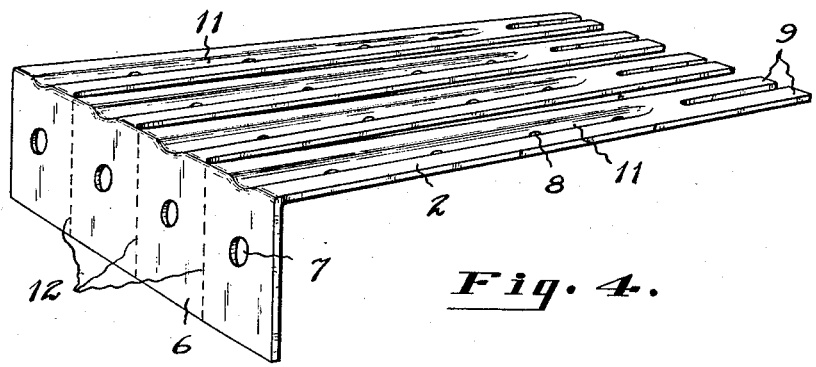
Fig. 4 is a perspective view similar to Fig. 3 showing longitudinal depressions formed in the spoke portions of the blank.
Figure 5:
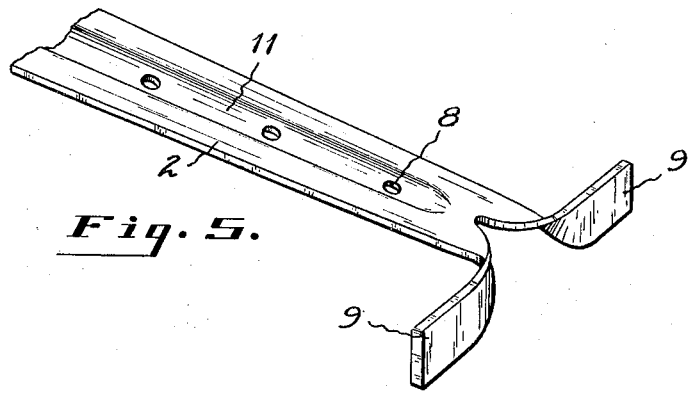
Fig. 5 is a perspective view showing the bifurcated ends of the spoke portions twisted in opposite directions.

The blank thus formed is passed to a suitable forming die which flanges the base 6 downwardly perpendicular to the plane of the spokes 2 or at an angle slightly greater than 90 degrees, depending upon whether the spider is to be dished or flat. The base 6 as shown in Fig. 3 is bent substantially on a line passing between the ends of the slots 10 between the spokes 2. Longitudinal depressions 11 are formed in the spokes 2 at the same time, as shown in Fig. 4, which extend from the juncture of the metal at the bifurcated ends 9 to the edge of the base 6, and the tongues 9 of each spoke are twisted substantially perpendicular to the horizontal plane of the spoke as shown in Fig. 5. The operation just described, namely, the flanging of the base 6, the formation of the depressions 11, and the twisting of the tongues 9 may be performed in a single machine having a multiple die.

Figure 6:
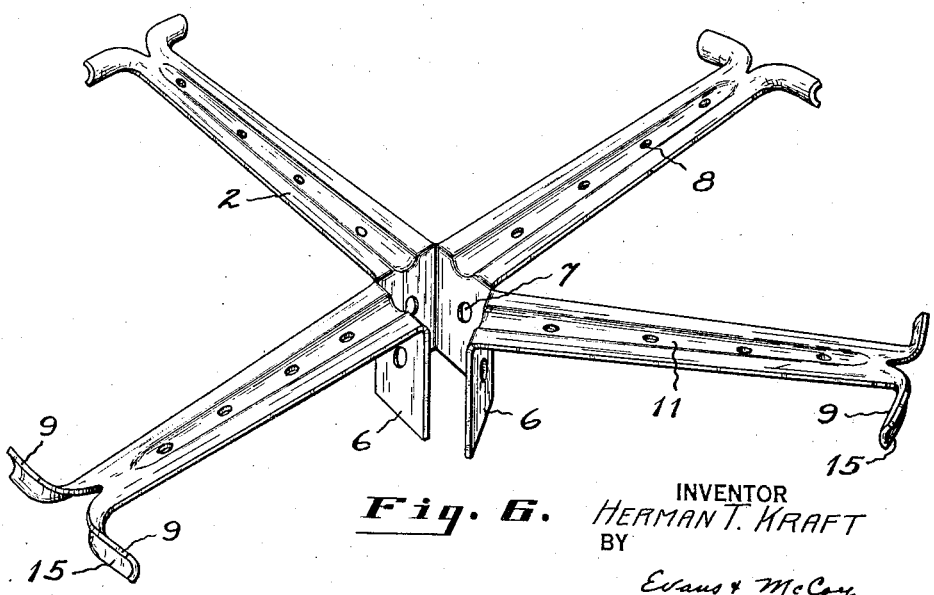
Fig. 6 is a perspective view showing the spoke portions partially moved to their radial positions.
Figure 7:
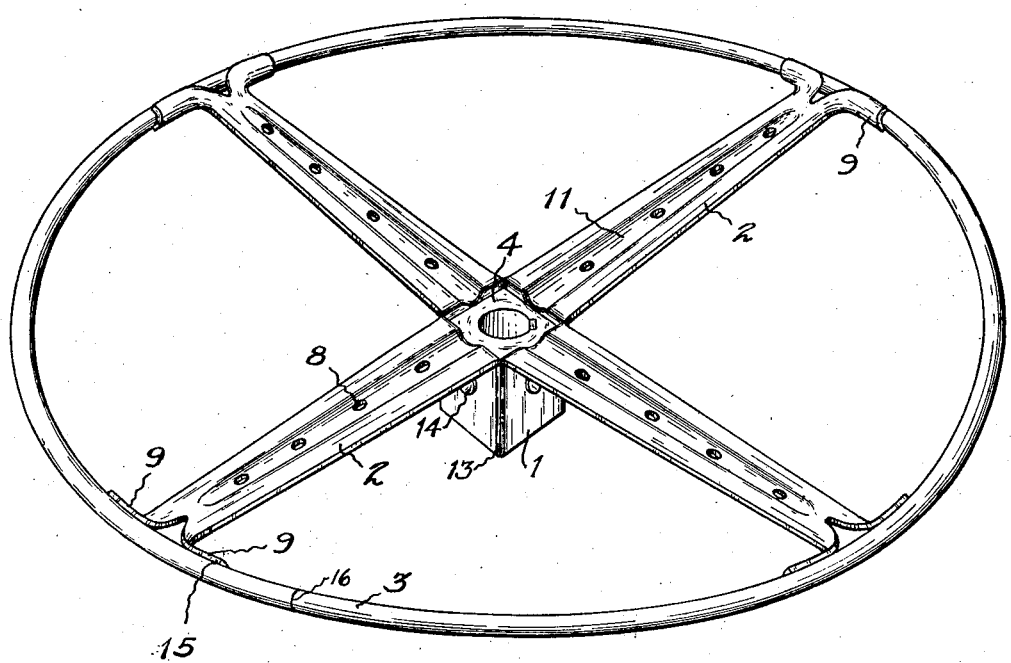
Fig. 7 is a perspective view showing the spoke portions formed around a central hub portion and the ends of the same secured to a rim element.
Figure 8:
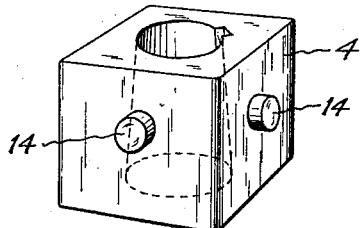
Fig. 8 is an enlarged perspective view of the hub portion.

The base 6 of the spider is then bent about the vertical lines 12, shown in Fig. 4, passing through the juncture of one spoke with its adjacent spoke, to the position shown in Fig. 6. The rectangular separately formed hub 4 having a projecting cylindrical lug 14 on each of its side faces is positioned within the walls of the base 6 which may now be called the spider hub 1, with the lugs 14 extending into the openings 7 thereof. The hub portion 1 is then completely bent about the hub 4 to the shape shown in Fig. 7 so that the walls thereof abut against the side faces of the hub 4. The meeting edges of the spider hub portion 1 are then welded together at 13 and if desirable the walls of the hub may be spot welded to the faces of the hub 4 to insure a more rigid connection therebetween.

The twisted tongues 9 of each spoke 2 are next formed to a suitable curved shape as shown in Fig. 6 to provide outwardly presenting channels 15 which lie in direct circumferential line with the channels 15 in the other spokes. The spider is finally formed to its finished shape by positioning the rim 3 comprising the split ring of bar stock in the channels 15, welding the ends together as indicated by the weld marks 16 and welding or otherwise securing the tongues 9 to the rim 3 at suitable points. It is preferable, however, that they be welded.

The composition material 5 is then molded about the spider thus formed so that it completely surrounds and is joined to the rim 3, spokes 2 and hub portion 1 with the exception of the end faces of the separately formed hub 4. The composition material during the molding operation flows through the perforations 8 in the spokes 2 to integrally unite the composition material on opposite sides of the spokes. It is preferable that the rim 3 be roughened by some suitable method so that the composition material 5 will rigidly adhere to the same.

It is evident from the drawings and foregoing description that a spider construction is provided which is very rigid and strong, which will satisfactorily withstand severe shocks because of the sturdy spoke and hub construction. The depressions 11 in the spokes add considerable strength to the same, particularly at points adjacent to the hub, and the bifurcated ends of the same also provide additional reinforcement. It is apparent that a method is provided wherein spiders for steering wheels may be economically produced with a minimum of scrap material.

Figure 10:
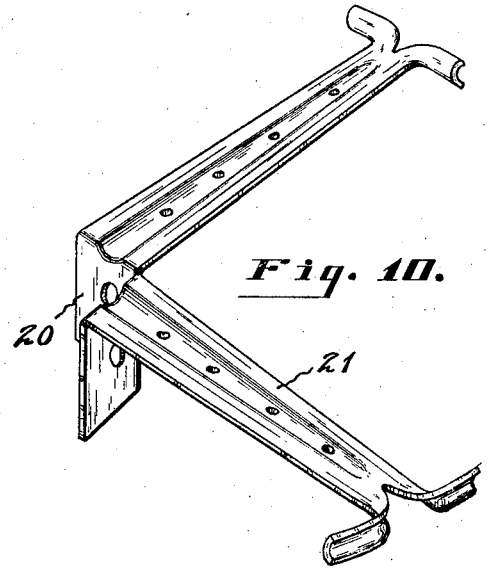
Fig. 10 is a partial perspective view of an optional spoke construction.
Figure 9:
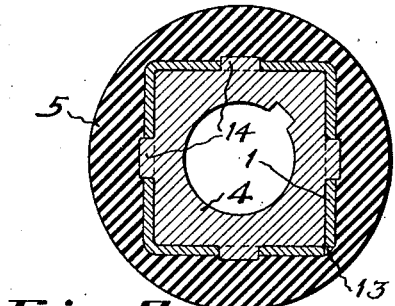
Fig. 9 is a section taken transversely through the hub of the completely formed wheel.

The spoke elements may be built up in two separate units such as the modified form shown in Fig. 10, each unit of which comprises a half hub portion 20 and spokes 21. The units may be abutted against opposite sides of a separately formed hub and welded or otherwise secured thereto.

It is to be understood that the particular shapes of the wheel and the procedure set forth are for the purpose of illustration and explanation, and that various modifications can be made without departing from the spirit of the broad invention, the scope of which is commensurate with the claims annexed hereto.

What I claim is:

1. A steering wheel spider comprising a central hub having a plurality of sides, lugs projecting from said sides, and a plurality of spoke portions having an integral interconnecting flange at their inner ends conforming in shape and secured to said hub with said lugs extending into openings in the walls of said flange.

2. A steering wheel comprising a central hub having radially projecting lugs thereon, a pair of spokes having an integral flanged perforated interconnecting portion, and a second pair of spokes having an integral flanged perforated innterconnecting portion, said pairs of spokes being arranged around said central hub with the flanges thereof abutted against and secured to the sides of said hub, said lugs on said hub being extended through the perforations in said flanges.

3. A steering wheel spider comprising a central hub having a plurality of sides, lugs projecting from said sides, a plurality of spokes having an integral interconnecting one-piece flange at their inner ends conforming in shape and secured to said hub with said lugs extending into openings in the walls of said flange and being permanently secured thereto, and a continuous rim element rigidly secured to the outer ends of said spokes radially outwardly of said hub.

4. A steering wheel spider comprising a central hub having a plurality of sides, lugs projecting from said sides, a plurality of spoke portions each having an integral flange at its inner end secured to said hub by said lugs extending into openings in the walls of said flange and an endless ring permanently carried by the radially outward extremities of said spoke portions.

5. A steering wheel spider comprising a central hub having a plurality of sides, lugs projecting from said sides, and a plurality of spoke portions having an integral interconnecting flange at their inner ends conforming in shape and secured to said hub with said lugs extending into openings in the walls of said flange, an endless ring carried by said spoke portions at their radial outward extremities, and composition material permanently enclosing said spider radially outwardly of said hub.

In testimony whereof I affix my signature.

HERMAN T. KRAFT.